US011374569B2

(12) United States Patent
Borrel et al.

(10) Patent No.: US 11,374,569 B2
(45) Date of Patent: Jun. 28, 2022

(54) PHYSICALLY UNCLONABLE FUNCTION DEVICE

(71) Applicant: STMicroelectronics (Rousset) SAS, Rousset (FR)

(72) Inventors: Nicolas Borrel, Gardanne (FR); Jimmy Fort, Puyloubier (FR); Mathieu Lisart, Aix en Provence (FR)

(73) Assignee: STMicroelectronics (Rousset) SAS, Rousset (FR)

(*) Notice: Subject to any disclaimer, the term of this patent is extended or adjusted under 35 U.S.C. 154(b) by 0 days.

(21) Appl. No.: 17/413,459

(22) PCT Filed: Nov. 28, 2019

(86) PCT No.: PCT/FR2019/000193
§ 371 (c)(1),
(2) Date: Jun. 11, 2021

(87) PCT Pub. No.: WO2020/120847
PCT Pub. Date: Jun. 18, 2020

(65) Prior Publication Data
US 2022/0052691 A1 Feb. 17, 2022

(30) Foreign Application Priority Data
Dec. 13, 2018 (FR) ...................................... 1872826

(51) Int. Cl.
*H03K 5/22* (2006.01)
*H03K 19/003* (2006.01)
(Continued)

(52) U.S. Cl.
CPC ... *H03K 19/00384* (2013.01); *H03F 3/45273* (2013.01); *H03F 3/45488* (2013.01);
(Continued)

(58) Field of Classification Search
CPC combination set(s) only.
See application file for complete search history.

(56) References Cited

U.S. PATENT DOCUMENTS 8,619,979 B2 * 12/2013 Ficke ................... H04L 9/3278
380/44
10,833,027 B2 * 11/2020 Lisart ................... H01L 23/528
(Continued)

FOREIGN PATENT DOCUMENTS

EP         3379770 A1    9/2018
WO      2020120847 A1    6/2020

OTHER PUBLICATIONS

Cao, Yuan, et al., "A Low Power Diode-Clamped Inverter-Based Strong Physical Unclonable Function for Robust and Lightweight Authentication", IEEE Transactions on Circuits and Systems—I: Regular Papers, vol. 65, No. 11, Nov. 2018, pp. 3864-3873.
(Continued)

*Primary Examiner* — Long Nguyen
(74) *Attorney, Agent, or Firm* — Slater Matsil, LLP

(57) ABSTRACT

The physically unclonable function device (DIS) comprises a set of MOS transistors (TR1$i$, TR2$j$) mounted in diodes having a random distribution of respective threshold voltages, and comprising N first transistors and at least one second transistor. At least one output node of the function is capable of delivering a signal, the level of which depends on the comparison between a current obtained using a current circulating in the at least one second transistor and a current obtained using a reference current that is equal or substantially equal to the average of the currents circulating in the N first transistors. A first means (FM1$i$) is configured to impose on each first transistor a respective fixed gate voltage regardless of the value of the current circulating in the first transistor, and a second means (SM2$j$) is configured to
(Continued)

impose a respective fixed gate voltage on each second transistor regardless of the value of the current circulating in the second transistor.

26 Claims, 6 Drawing Sheets

(51) Int. Cl.
*H03K 19/00* (2006.01)
*H03K 19/17736* (2020.01)
*H03F 3/45* (2006.01)
*H03L 7/097* (2006.01)
*H04L 9/32* (2006.01)

(52) U.S. Cl.
CPC ... *H03K 19/0027* (2013.01); *H03K 19/17744* (2013.01); *H03L 7/097* (2013.01); *H04L 9/3278* (2013.01); *H04L 2209/12* (2013.01)

(56) References Cited

U.S. PATENT DOCUMENTS

| | | |
|---|---|---|
| 2011/0317829 A1 | 12/2011 | Ficke et al. |
| 2013/0322617 A1 | 12/2013 | Orshansky |
| 2018/0277496 A1 | 9/2018 | Lisart et al. |
| 2019/0074256 A1 | 3/2019 | Wang et al. |

OTHER PUBLICATIONS

Che, Wenjie et al., "A Non-Volatile Memory Based Physically Unclonable Function without Helper Data," IEEE Computer-Aided Design, pp. 148-153, Nov. 3, 2014.

Su, Haibo, et al., "A Machine Learning Attacks Resistant Two Stage Physical Unclonable Functions Design", 2018 IEEE 3rd International Verification and Security Workshop, Jul. 2-4, 2018, 4 pages.

* cited by examiner

PHYSICALLY UNCLONABLE FUNCTION DEVICE

CROSS-REFERENCE TO RELATED APPLICATIONS

This application is a section 371 National Phase filing of PCT Patent Application No. PCT/FR2019/000193, filed on Nov. 28, 2019, which claims the priority benefit of French patent application number 1872826, filed on Dec. 13, 2018, all of which applications are hereby incorporated by reference in their entireties to the maximum extent allowable by law.

TECHNICAL FIELD

Modes of implementation and embodiments of the invention relate to physically unclonable functions (PUF), and more particularly to those produced within an integrated circuit.

BACKGROUND

A physically unclonable function makes it possible to automatically generate an unpredictable unique code that depends on random or partly random physical characteristics of the physically unclonable function. These physical characteristics may be brought about by variations during the production of the physically unclonable function.

Cloning such a function is thus very difficult, or even impossible.

Moreover, the content of the code that is generated, which is unique, because it is different from one physically unclonable function to another physically unclonable function, is not able to be predicted and may depend for example on a particular configuration of components when the function is turned on. Thus, for example, a physically unclonable function may be produced by a non-volatile memory that has content, when turned on, that depends on the partially random physical characteristics of the memory, these production variations leading to different physical characteristics for different memories.

It is possible to produce physically unclonable functions for example using random access memories or non-volatile memories, or else ring oscillators or else specific logic circuits.

However, these devices from the prior art, in some cases, may be more or less easily detectable within the integrated circuit, or then not be very robust with regard to temperature changes or aging, or else be sensitive to fault injection attacks.

The French patent application published under no. 3064435 has proposed a physically unclonable function structure based on diode-connected transistors, having a random distribution of threshold voltages.

Although such a solution makes it possible to achieve a physically unclonable function that is difficult to detect while at the same time being sufficiently robust with regard to temperature variations or aging, it requires a number of modifications in conventional CMOS processes.

Moreover, the variability of the physically unclonable function is due not only to the variability of the threshold voltages of the transistors, but also to other parameters that are difficult to control, such as for example the formation of diodes resulting from connections between PMOS and NMOS transistors.

There is therefore a need to propose a physically unclonable function structure in which the variability of other parameters is reduced as much as possible, or even eliminated, such that the variation of the function is linked essentially to the variability of the threshold voltages of the diode-connected transistors.

There is also a need to be able to produce such a function using conventional CMOS production methods, without requiring modifications.

SUMMARY

According to one embodiment, what is proposed is an integrated physically unclonable function device, based on a set of diode-connected MOS transistors having a random distribution of threshold voltages resulting, in the conventional transistor production method, from the implantations of dopants leading to implanted source and drain regions having unpredictable characteristics that are different from one transistor to another. A certain number of these transistors are then used as a group of "control" transistors, which will make it possible to define a reference current equal or substantially equal to the average of the currents flowing in these control transistors. The other transistors will be used to define the digital output code of the physically unclonable function. All of these other transistors, due to their random distribution of threshold voltages, have a random distribution of drain-source currents, and comparing each drain-source current of a transistor associated with a bit of the digital code with the reference current will make it possible to define the logic value 0 or 1 of this bit.

Moreover, for each transistor, whether this is a control transistor or a transistor associated with a bit of the digital code delivered by the function, a fixed gate voltage is imposed regardless of the value of the drain-source current flowing through it.

The variability of some parameters, such as PMOS NMOS diodes, is thus overcome, and this variability is limited as much as possible to that of the threshold voltages of the transistors.

Moreover, according to another embodiment, it is possible to overcome the effects of aging of the transistors by preferably using in particular structurally identical branches to generate the currents flowing in the "control" transistors and in the one or more transistors associated with the one or more bits of the digital code.

According to one aspect, what is proposed is an integrated circuit comprising at least one area including a physically unclonable function device.

The device comprises a set of diode-connected MOS transistors having a random distribution of respective threshold voltages.

This set includes N first transistors and at least one second transistor.

The device also comprises at least one output node of the function capable of delivering a signal whose level depends on the comparison between a first current obtained from a reference current equal or substantially equal to the average of the currents flowing in the N first transistors, and a second current obtained from a current flowing in the at least one second transistor.

The term "obtained" is understood in a very broad sense.

A current obtained from another current may thus be equal to this other current or else different from this other current while still being obtained from this other current, for example by algebraically adding an offset current to this other current.

Plus, as will be seen in more detail below, the addition of an offset current to the reference current and the addition of the same offset current to the current flowing in the at least one second transistor makes it possible to implement an embodiment that makes it possible to even further reduce the effects of aging of the transistors, or even to overcome them.

The group of N first transistors forms a group of "control" transistors that will make it possible to define the reference current.

This reference current may be equal to the average of the currents flowing in the N first transistors or else, in some cases, slightly different from this average, in order for example to identify instability risks in the comparison when the current flowing in a second transistor is too close to the reference current equal to the average.

The expression "equal or substantially equal to the average" may therefore be understood to mean "equal to the average to within a tolerance". This tolerance may for example be equal to plus or minus a few ten percent of the average.

As indicated above, each second transistor will be associated with an output signal whose value will make it possible to define a logic value of a bit of a unique digital code delivered by the physically unclonable function, for example when the area of the integrated circuit is turned on.

Although the invention may very well apply with just one second transistor, the number of second transistors is generally higher, since it defines the number of bits of the code delivered by the function. And when this code is advantageously used as a key, it is preferable for this number of bits to be large, at least higher than 10, for example 64 or 128.

Likewise, in order to achieve a good definition of the reference current, it is preferable for the number N to be sufficiently large.

By way of indication, a number N may be chosen that is preferably higher than or equal to 10, this number N however being able to be much higher, for example of the order of 100, without this value being limiting.

Likewise, it is possible, but not necessary, for the number N of first transistors to be equal to the number of second transistors.

The device furthermore comprises a first circuit configured so as to impose, on each first transistor, a fixed respective gate voltage regardless of the value of the current flowing in this first transistor, and a second circuit configured so as to impose, on each second transistor, a fixed respective gate voltage regardless of the value of the current flowing in this second transistor.

According to one embodiment, the first circuit includes, for each first transistor, a first negative-gain amplifier whose output is fed back, by way of a first bias transistor, to its input, which is also coupled to the gate of the first transistor.

The first bias transistor is advantageously intended to bias the gate of the first transistor, and has a first conductive electrode, for example the source, coupled to the input and a second conductive electrode, for example the drain.

The second conductive electrodes of the first bias transistors associated with the N first transistors are connected to one another.

The first amplifier, via the gate-source voltage of the first bias transistor, will bias the gate of the first transistor, and will stabilize the gate voltage of the first transistor at a fixed value regardless of the value of the current flowing in this first transistor, due to the negative-gain feedback of the output terminal to its input.

According to one embodiment, the first amplifier includes a first input transistor, in a common source configuration, the gate of which is coupled to the input of the first amplifier, a first conductive electrode of which, for example the source, is connected to a reference supply terminal, for example ground, and a second conductive electrode of which, for example the drain, is coupled to the output of the first amplifier, which is itself coupled to a first bias stage and to the gate of the first bias transistor.

The common source configuration of the first input transistor makes it possible to achieve the negative gain.

Moreover, this transistor in a common source configuration will make it possible to better track the production method variations and the temperature variations, and therefore to make the variability of the physically unclonable function device less sensitive to such variations.

According to one embodiment, the first amplifier furthermore comprises a cascode transistor connected between the second electrode of the first input transistor and the output of the first amplifier.

This cascode transistor makes it possible to equalize the drain-source voltage of the first input transistor with the drain-source voltage of the first transistor, so as to put these two transistors into the same bias state and into the same conduction state.

The N first transistors, the first amplifier and the first bias transistor are of the same conductivity type, for example of N conductivity type.

According to one embodiment, the second circuit includes, for each second transistor, a second negative-gain amplifier whose output is fed back, by way of a second bias transistor, to its input, which is coupled to the gate of the second transistor.

The second bias transistor is advantageously intended to bias the gate of the second transistor, and has a first conductive electrode, for example the source, coupled to the input and a second conductive electrode, for example the drain, coupled (directly or indirectly) to the corresponding output node.

According to one embodiment, the second amplifier includes a second input transistor, in a common source configuration, the gate of which is coupled to the input of the second amplifier, a first conductive electrode of which is connected to a reference supply terminal and a second conductive electrode of which is coupled to the output of the second amplifier, which is coupled to a second bias stage and to the gate of the second bias transistor.

In this case too, the second amplifier furthermore advantageously comprises a cascode transistor connected between the second conductive electrode of the second input transistor and the output of the second amplifier.

According to one embodiment, the second amplifier and the second bias transistor are of the same conductivity type, for example of N conductivity type.

In order to be as insensitive as possible to temperature variations and to the effects of aging of the transistors, the first circuit and the second circuit are structurally identical, and the transistors of the first circuit and the transistors of the second circuit are matched transistors.

As indicated above, according to a first variant, the first current may be the reference current and the second current is the current flowing in the at least one second transistor.

According to one embodiment compatible with this first variant, the device furthermore comprises, between the first circuit and the second means, a current mirror stage configured so as to deliver the reference current from the sum of the currents flowing in the first transistors.

In one simple embodiment, the current mirror has a division ratio equal to 1/N.

That being the, in order to be able to detect unstable bits of the digital code delivered by the function, the current mirror preferably has a division ratio that is able to be adjusted between a plurality of values including the value 1/N and additional values situated either side of the value 1/N.

According to a second variant, which makes it possible in particular to overcome effects of the aging of the transistors, it is possible to algebraically add an offset current at least to the current flowing in the at least one second transistor.

That being the, in order to even further overcome effects of the aging of the transistors, it is preferable to algebraically add an offset current not only to the current flowing in the at least one second transistor but also to the reference current.

In other words, according to one embodiment, the first current is the reference current algebraically increased by an offset current, and the second current is the current flowing in the at least one second transistor algebraically increased by the offset current.

The expression "algebraically increased by an offset current" means "increased by a offset current" if this offset current is positive or else "decreased by the absolute value of an offset current" if this offset current is negative.

According to one embodiment compatible with this second variant, the device comprises:

for each first transistor, a first branch incorporating the first transistor and the corresponding first circuit, and for each second transistor, a second branch incorporating the second transistor and the corresponding second circuit, each first branch and each second branch being structurally identical.

According to one embodiment, each first branch includes:

a first part incorporating the corresponding first transistor and the corresponding first circuit, and a second part incorporating a diode-connected additional first transistor.

The second part is common to all of the first branches, and the first parts of all of the first branches are connected to the common second part.

Moreover, according to this embodiment, each second branch incorporates the corresponding second transistor, the corresponding second circuit and a diode-connected additional second transistor.

The additional first transistor and each additional second transistor are configured so as to have one and the same gate-source voltage and one and the same drain-source voltage.

According to one embodiment, the device comprises:

an additional first current mirror incorporating the additional first transistor and configured so as to deliver, from the current flowing in the common second part, a first intermediate current equal to the average of the currents flowing in the N first transistors algebraically increased by the offset current, and associated with each second branch, an additional second current mirror incorporating the corresponding additional second transistor and configured so as to deliver the corresponding second current.

According to one embodiment, the additional first mirror has a division ratio equal to 1/N and incorporates another additional first transistor, the two additional first transistors being configured so as to have one and the same gate-source voltage but different respective drain-source voltages.

Each additional second mirror has for example a division ratio equal to one and incorporates another additional second transistor, the two additional second transistors being configured so as to have one and the same gate-source voltage but different respective drain-source voltages.

The other additional first transistor and each other additional second transistor advantageously have the same gate-source voltage and the same drain-source voltage.

The offset current delivered by the additional first mirror and the offset current delivered by each additional second mirror are then identical.

According to one embodiment, the device furthermore comprises:

a first cascode current mirror system coupled between the additional first current mirror, on the one hand, and each output node, on the other hand, and configured so as to deliver the first current from the first intermediate current, and a second cascode current mirror system coupled between each additional second mirror and each output node and configured so as to copy the second current.

In one simple embodiment, the first cascode current mirror system has a division ratio equal to one.

However, in order to be able to detect unstable bits of the digital code delivered by the function, the first cascode current mirror system preferably has a division ratio that is able to be adjusted between a plurality of values including the value one and additional values situated either side of the value one.

According to another aspect, what is proposed is a method for automatically generating an unpredictable unique code at each output node of a physically unclonable function device belonging to an integrated circuit such as defined above, comprising at least one turn-on of the area of the integrated circuit incorporating the device.

According to one mode of implementation, the method comprises at least two additional turn-ons respectively having offsets of the reference current with respect to the average of the currents flowing in the N first transistors, the offsets being respectively performed on either side of the average.

This advantageously makes it possible to detect the unstable bits of the digital code delivered at the output of the device, and to make a decision for example as to the logic value of these unstable bits.

BRIEF DESCRIPTION OF THE DRAWINGS

Other advantages and features of the invention will become apparent upon examining the detailed description of wholly non-limiting modes of implementation and embodiments of the invention and the appended drawings, in which.

DETAILED DESCRIPTION OF ILLUSTRATIVE EMBODIMENTS

Figure 1:
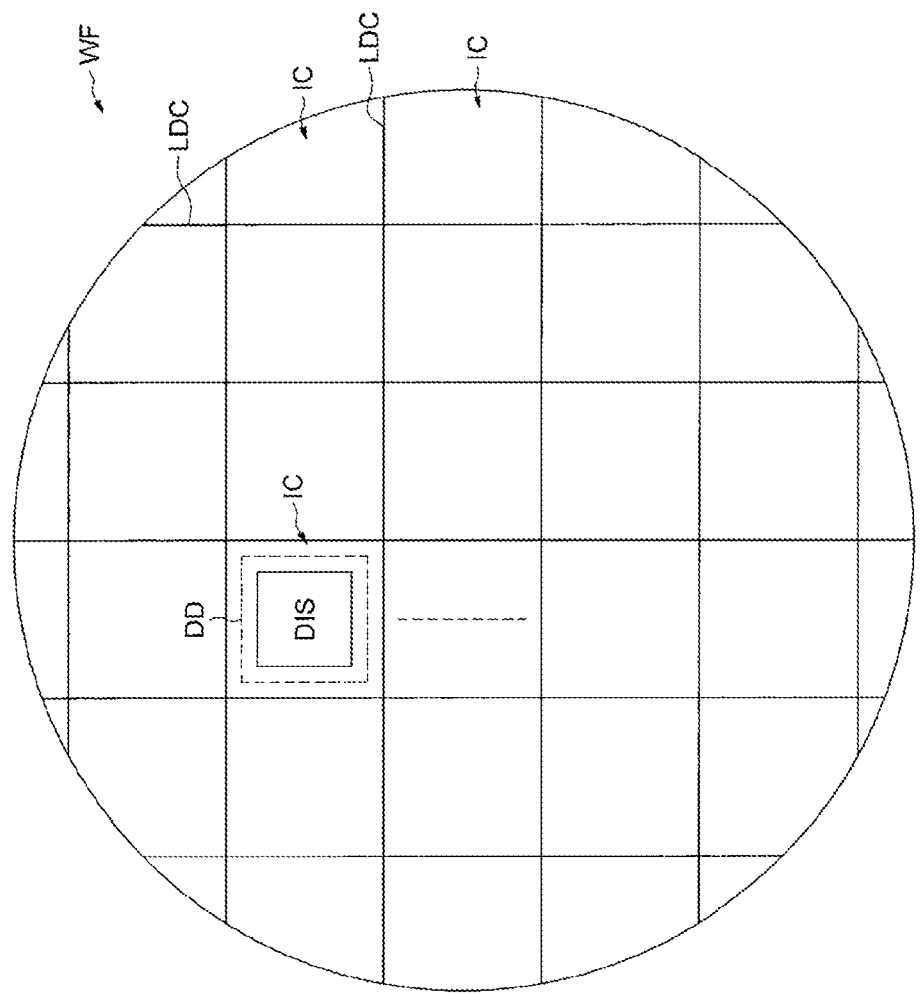
FIG. 1 schematically illustrates one embodiment of an integrated circuit according to the invention, FIG. 2 schematically illustrates one embodiment of a physically unclonable function device according to the invention, FIG. 3 schematically illustrates a random distribution of threshold voltages of transistors of a physically unclonable function device according to the invention, FIG. 4 schematically illustrates another random distribution in relation to a physically unclonable function according to the invention, FIG. 5 schematically illustrates one variant of the invention, and FIGS. 6 and 7 schematically illustrate other embodiments and modes of implementation of the invention.

In FIG. 1, the reference WF denotes a semiconductor wafer conventionally having, in a known manner, cutting lines LDC for the zones of the wafer each containing an integrated circuit IC.

This integrated circuit IC in this case contains an area DD incorporating a physically unclonable function device DIS.

The substrate in and on which the various devices DIS are produced may be a bulk substrate or else a silicon on insulator (SOI) substrate.

Moreover, the device DIS is in this case produced using 45-nanometer CMOS technology, although this example is in no way limiting.

Figure 2:
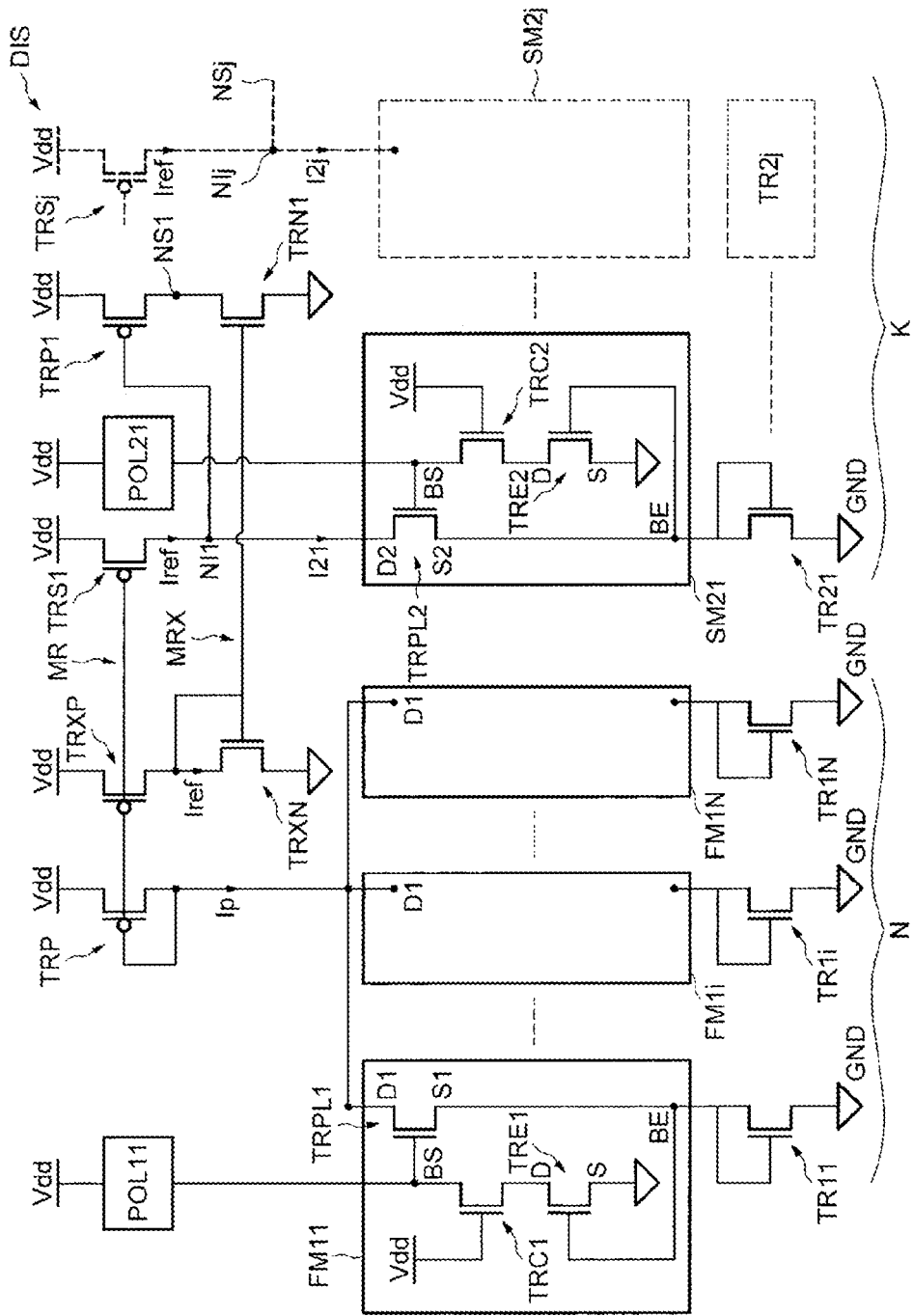

FIG. 2 schematically illustrates one possible embodiment of a physically unclonable function device DIS.

This device DIS in this case comprises a set of MOS transistors, in this case for example NMOS transistors, TR1$i$, TR2$j$ having a respective random threshold voltage distribution.

This set of MOS transistors includes a group of N first transistors TR11-TR1N and, in this example, K second transistors TR21-TR2K, which, as will be seen in more detail hereinafter, will make it possible to define the logic values of K bits of a code generated at the output of the physically unclonable function device DIS.

Figure 3:
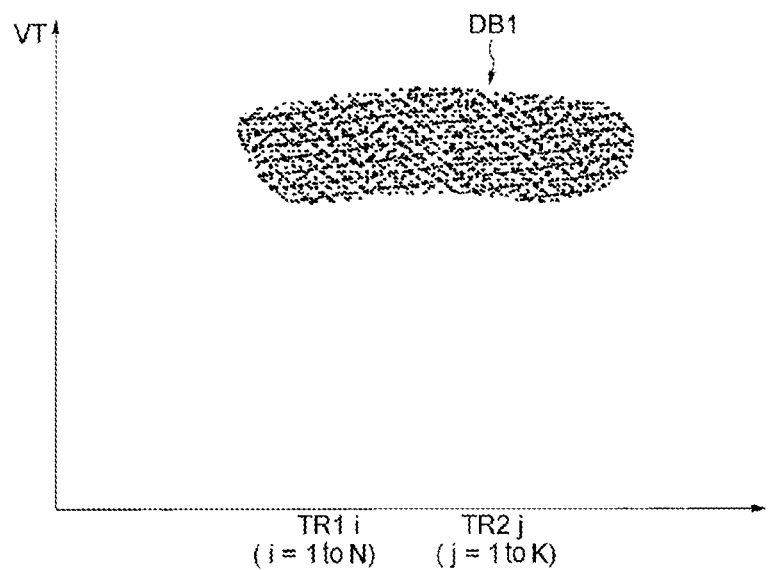
Figure 4:
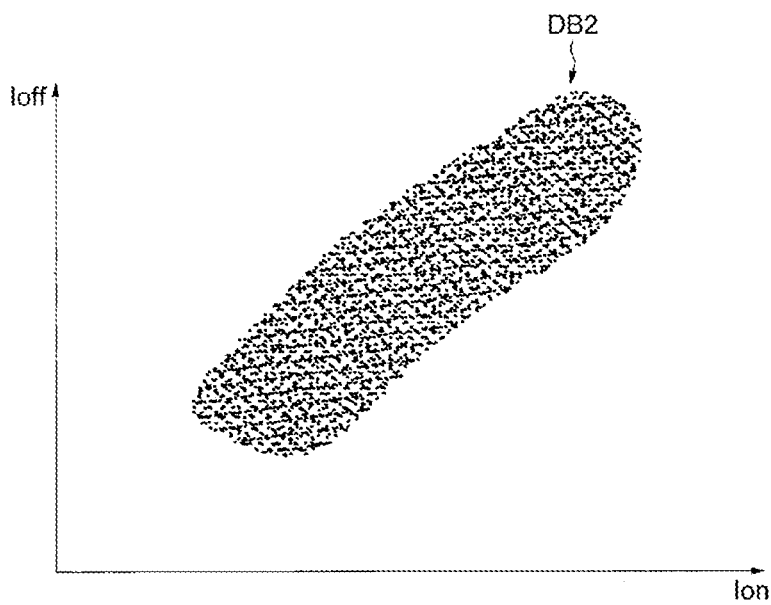

The random threshold voltage VT distribution DB1 is illustrated highly schematically in FIG. 3 and may be reflected in particular, as illustrated in FIG. 4, in a random distribution DB2 of the ratio Ion/Ioff between the current Ion of the transistor in the on state and the current Ioff of the transistor in the off state.

By way of indication, in the example described here, the values of the currents Ion of the various transistors TR1$i$ and TR2$j$ vary around an average value of a few microamperes, for example between 1 and 10 microamperes, per micrometer with a deviation of for example between 15% and 50%.

Of course, this is just an example, and the invention is compatible with any random distribution of values, regardless of the spread of this distribution.

Returning now to FIG. 2, it is seen that each first transistor TR1$i$ (i varying from 1 to N) is an NMOS transistor arranged in a diode-connected configuration, that is to say whose gate is linked to the drain, for example by a metallization.

All of the first transistors TR1$i$ are connected, by their source, to a reference supply voltage, for example ground GND.

The device DIS furthermore comprises a first circuit FM11-FM1N configured so as to impose, on each first transistor TR1$i$, a fixed respective gate voltage regardless of the value of the current flowing in this first transistor TR1$i$.

Of course, this fixed gate voltage might not be identical for all of the first transistors TR1$i$.

A more detailed description will now be given of the first circuit FM11 associated with the first transistor TR11, with the knowledge that the structure of each circuit FM1$i$ is identical.

The first circuit FM11 includes a first negative-gain amplifier TRE1, whose output BS is fed back, by way of a first bias transistor TRPL1, to its input BE.

This input BE is coupled to the gate of the first transistor TR11.

The first bias transistor TRPL1 is intended to bias the gate of the first transistor TR11.

The first bias transistor TRPL1 has a first conductive electrode, in this case the source S1, coupled to the input BE, and a second conductive electrode, in this case the drain D1.

The N second conductive electrodes D1 of the N first bias transistors respectively associated with the N first transistors TR1$i$, i varying from 1 to N, are connected to one another.

The first amplifier in this example includes a first input transistor TRE1, in a common source configuration, whose gate is coupled to the input BE of the first amplifier.

The first input transistor TRE1 has a first conductive electrode, in this case the source S, connected to the reference supply terminal GND, and a second conductive electrode, in this case the drain D, coupled to the output BS of the first amplifier by way of a cascode transistor TRC1 whose gate is linked to the supply voltage Vdd.

This cascode transistor TRC1, which is not essential, makes it possible to equalize the drain-source voltage of the first input transistor with the drain-source voltage of the first transistor TR11, so as to put these two transistors into the same bias state and into the same conduction state.

The output BS of the first amplifier is coupled to a first bias stage POL1 having a conventional and known structure.

The output BS is also coupled to the gate of the first bias transistor TRPL1.

The N first transistors, the first amplifier and the first bias transistor are of the same conductivity type, in this case N conductivity type. In other words, all of these transistors are NMOS transistors.

The first amplifier, having a negative gain, via the gate-source voltage of the first bias transistor TRPL1, will bias the gate of the first transistor TR11, and will stabilize the gate voltage of the first transistor TR11 at a fixed value regardless of the value of the current flowing in this first transistor TR11, due to the negative feedback of the output terminal to its input.

Each second transistor TR2$j$ (j varying from 1 to K) is an NMOS transistor arranged in a diode-connected configuration, that is to say whose gate is linked to the drain, for example by a metallization.

All of the second transistors TR2$j$ are connected, by their source, to a reference supply voltage, for example ground GND.

The device DIS furthermore comprises a second circuit SM2$j$, j varying from 1 to K, configured so as to impose, on each second transistor TR2$j$, a fixed respective gate voltage regardless of the value of the current flowing in this second transistor TR2$j$.

Of course, this fixed gate voltage might not be identical for all of the second transistors TR2$j$.

A more detailed description will now be given of the second circuit SM21 associated with the second transistor TR21, with the knowledge that the structure of each circuit SM2$j$ is identical.

The structure of the circuit SM2$j$ and that of the circuit FM1$i$ are identical, and the transistors that form the structures are matched, so as to have characteristics that vary identically following temperature variations or following an aging phenomenon.

More precisely, the second circuit SM21 includes a second negative-gain amplifier TRE2, whose output BS is fed back, by way of a second bias transistor TRPL2, to its input BE.

This input BE is coupled to the gate of the second transistor TR21.

The second bias transistor TRPL2 is intended to bias the gate of the second transistor TR21.

The second bias transistor TRPL2 has a first conductive electrode, in this case the source S2, coupled to the input BE, and a second conductive electrode, in this case the drain D2.

The second electrode D2 is coupled to an intermediate node NI1, which is itself coupled to the output node NS1 associated with the transistor TR21.

The K second conductive electrodes D2 of the K second bias transistors respectively associated with the K second transistors TR2$j$, j varying from 1 to K, are respectively connected to the K intermediate nodes NIj, which are themselves respectively coupled to the K output nodes NSj, j varying from 1 to K.

The second amplifier in this example includes a second input transistor TRE2, in a common source configuration, whose gate is coupled to the input BE of the second amplifier.

The second input transistor TRE2 has a first conductive electrode, in this case the source S, connected to the reference supply terminal GND, and a second conductive electrode, in this case the drain D, coupled to the output BS of the second amplifier by way of a cascode transistor TRC2 whose gate is linked to the supply voltage Vdd.

This cascode transistor TRC2, which is not essential, has the same advantage as the one explained above for the cascode transistor TRC1.

The output BS of the second amplifier is coupled to a second bias stage POL21 having a conventional and known structure.

The output BS is also coupled to the gate of the second bias transistor TRPL2.

The K second transistors, the second amplifier and the second bias transistor are of the same conductivity type, in this case N conductivity type. In other words, all of these transistors are NMOS transistors.

The second negative-gain amplifier, via the gate-source voltage of the second bias transistor TRPL2, will bias the gate of the second transistor TR21, and will stabilize the gate voltage of the second transistor TR21 at a fixed value regardless of the value of the current flowing in this second transistor TR21, due to the negative feedback of the output terminal to its input.

The device DIS in this case also includes a current mirror MR connected between the common drains D1 of the first bias transistors TRPL1 and each of the intermediate nodes NIj.

The current mirror MR in this case includes a main PMOS transistor, referenced TRP, whose source is connected to a supply terminal that is intended to receive a supply voltage Vdd. This main transistor TRP is diode-connected to its gate, which is linked to its drain.

The drain of the transistor TRP is connected to the terminal common to the common drains D1 of the first bias transistors.

The current mirror MR also includes K secondary transistors TRSj, j varying from 1 to K, each connected between the supply voltage Vdd and the corresponding intermediate node NIj.

The gates of the secondary transistors TRSj are connected to the gate and to the drain of the main transistor TRP.

The ratio between the size of the main transistor TRP and the size of each secondary transistor TRSj is equal to N, that is to say to the number of first transistors TR1$i$.

In practice, this size ratio may be achieved using a size of the transistor TRP that is effectively N times larger than the size of a secondary transistor TRSj or else using for example N main transistors of size 1 that are connected in parallel.

Due to this, when the device is supplied with power, a current Ip flows between the drain of the transistor TRP and the common drains of the first bias transistors TRPL1. This current Ip is equal to the sum of the currents flowing in the first transistors TR1$i$.

The outputs of the current mirror respectively deliver a reference current, which is in this case equal to Ip/N, to the K intermediate nodes NIj.

This reference current is therefore equal in this case to the average of the currents flowing in the first transistors TR1$i$.

Given the random distribution of the threshold voltages of all of the transistors TR1$i$, TR2$j$, the current I2$j$ flowing through the second transistor TR2$j$ may lie on one side or the other of the reference current Iref.

And, if the reference current Iref is higher than the current I2$j$, the voltage of the corresponding intermediate node NIj rises to Vdd.

If the reference current Iref is lower than the current I2$j$, the voltage of the corresponding intermediate node NIj drops to 0.

Although it would be possible to perform this comparison at the intermediate node NIj, this node then forming the output node, it is preferable to provide an output stage, advantageously with a high gain, between each intermediate node NIj and the corresponding output node NSj, in order to perform a current comparison.

This output stage includes a first auxiliary PMOS transistor TRXP forming part of the current mirror MR and also delivering the reference current Iref to an auxiliary current mirror MRX including a diode-connected second auxiliary NMOS transistor TRXN and a third auxiliary transistor TRN1 delivering, on its drain, connected to the output node NSj, the reference current Iref.

This output stage also includes a fourth auxiliary PMOS transistor TRP1, in a common source configuration, whose gate is connected to the intermediate node NIj.

The drain of the transistor TRP1 and the drain of the transistor TRN1 are connected to one another and form the output node NSj.

At this output node, if the reference current Iref is higher than the current I2$j$, the output signal has a first level corresponding to a first logic value for the corresponding bit, for example the value 1.

If the reference current Iref is lower than the current I2$j$, the output signal has a second level corresponding to a second logic value for the corresponding bit, for example the value 0.

Figure 5:
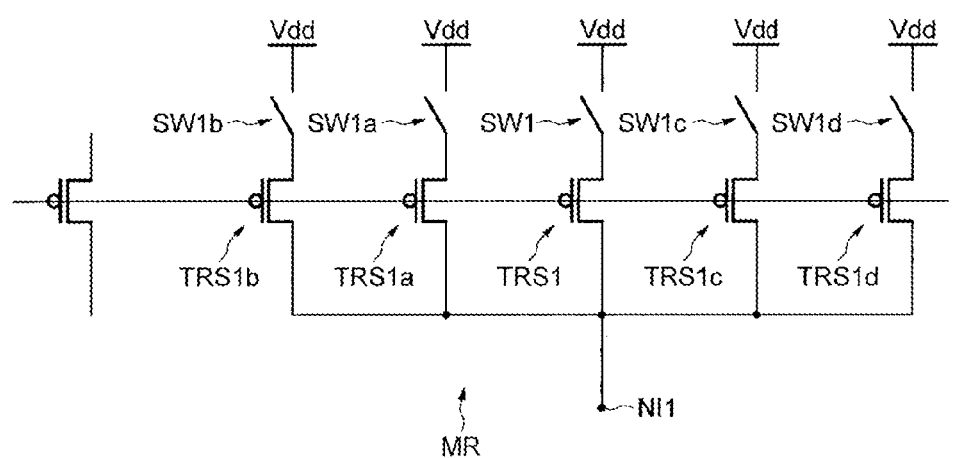

The embodiment of FIG. 5 makes it possible to detect bits of the digital code delivered by the device DIS whose values might not be stable and repeatable.

Specifically, when the device DIS of FIG. 2 is supplied with power, it may very well be the case that, for some second transistors, the currents flowing through them have levels close to the level of the reference current Iref.

In this case, the characteristics of the output stage may in particular lead to comparisons that give unstable or non-repeatable values from one turn-on to another.

In other words, the logic values of the bits associated with these second transistors may change from one turn-on to another, for example due to the comparison instability.

The embodiment of FIG. 5 makes it possible to detect these bits and to make a decision as to the management of their value.

This may advantageously be performed when the device DIS is first turned on.

As illustrated in FIG. 5, the current mirror MR has a division ratio that is able to be adjusted between a plurality of values including the value 1/N and additional values situated either side of the value 1/N.

More precisely, for the first output node, the secondary transistor TRS1 is connected to the intermediate node NI1. This secondary transistor TRS1 has a width N times smaller than that of the main transistor TRP.

It is connected to the supply terminal intended to receive the supply voltage Vdd by a controllable switch SW1.

The current mirror MR also includes, in this example, four other secondary transistors TRS1a, TRS1b, TRS1c and TRS1d that are respectively connected to the supply terminal by four other controllable switches SW1a, SW1b, SW1c and SW1d.

The drains of these four other secondary transistors TRS1a, TRS1b, TRS1c and TRS1d are also connected to the intermediate node NI1.

The ratio between the width of each other secondary transistor and the width of the main transistor TRP is equal to 1/N+/−x %.

For example, the ratio between the width of the secondary transistor TRS1a and the width of the main transistor TRP is equal to 1/N+5%.

The ratio between the width of the secondary transistor TRS1b and the width of the main transistor TRP is equal to 1/N+10%.

The ratio between the width of the secondary transistor TRS1c and the width of the main transistor TRP is equal to 1/N−5%.

The ratio between the width of the secondary transistor TRS1d and the width of the main transistor TRP is equal to 1/N−10%.

Thus, if one of the other secondary transistors is activated, the current delivered to the intermediate node will be offset by a few percent with respect to the current Iref delivered by the secondary transistor TRS1, that is to say with respect to the average of the sum of the currents flowing in the N first transistors TR1i.

The structural modification of the mirror that has just been described for the node NI1 is repeated for each intermediate node NIj, j varying from 1 to K.

At the first turn-on, one of the four switches SW1a to SW1d, for example the switch Sw1b, is selected for each intermediate node NIj.

Due to this offset in the reference current, the logic values of the unstable bits have the value for example 0.

The reference current is then offset in the other direction, by activating the switch symmetrical to the switch SW1b, which is the switch SW1d.

This therefore gives the previous bits the logic values 1.

Processing circuitry will then compare the digital code delivered to the output nodes NSj of the device DIS, bit by bit, so as to identify the bits whose logic values have changed between an offset to the right and an offset to the left of the reference current.

These bits are considered to be unstable.

These processing circuitry may include logic circuits.

The processing circuitry then make a decision as to the management of these unstable bits.

In this respect, three solutions are possible, for example.

A first solution involves not taking these unstable bits into consideration in the digital code delivered by the device DIS.

In this case, the digital code will not include these bits.

Another solution involves giving these unstable bits an arbitrary logic value.

It is also possible to choose an arbitrary combination of the three previous solutions as a solution.

And this decision will be stored in the device DIS.

At the end of this decision-making, the device DIS may then be put back in its first state corresponding to that illustrated in FIG. 2 (secondary transistors TRSj selected with a current ratio equal to 1/N), and the decision made as to the one or more unstable bits remains stored and applicable thereafter.

It will also be applicable in all subsequent turn-ons for which it will no longer be necessary to offset the current Iref.

A digital code that is perfectly repeatable from one turn-on to another is then achieved.

It should lastly be noted that the device DIS is produced using conventional CMOS production methods.

The invention is not limited to the embodiments and modes of implementation that have just been described, but encompasses all variants thereof.

In this regard, reference will now be made more specifically to FIGS. 6 and 7, which schematically illustrate another possible variant of the invention that makes it possible to reduce the effects of the aging of the transistors, or even to overcome them.

Specifically, although the embodiments illustrated in FIGS. 2 and 5 in particular are entirely satisfactory, it turns out that the transistors TRP and TRS1 from FIG. 2 generally age differently. Specifically, even though they have one and the same gate-source voltage, they respectively have different drain-source voltages.

As a result, the transistors TRPL1 and TRPL2 illustrated in FIG. 2 and respectively incorporated into the first circuit FM11 and the second circuit SM21 also exhibit different aging, which may ultimately lead to different decisions being made as to the value of the output bits of the physically unclonable function device, and therefore to a digital code that is not perfectly repeatable from one turn-on to another.

Figure 6:
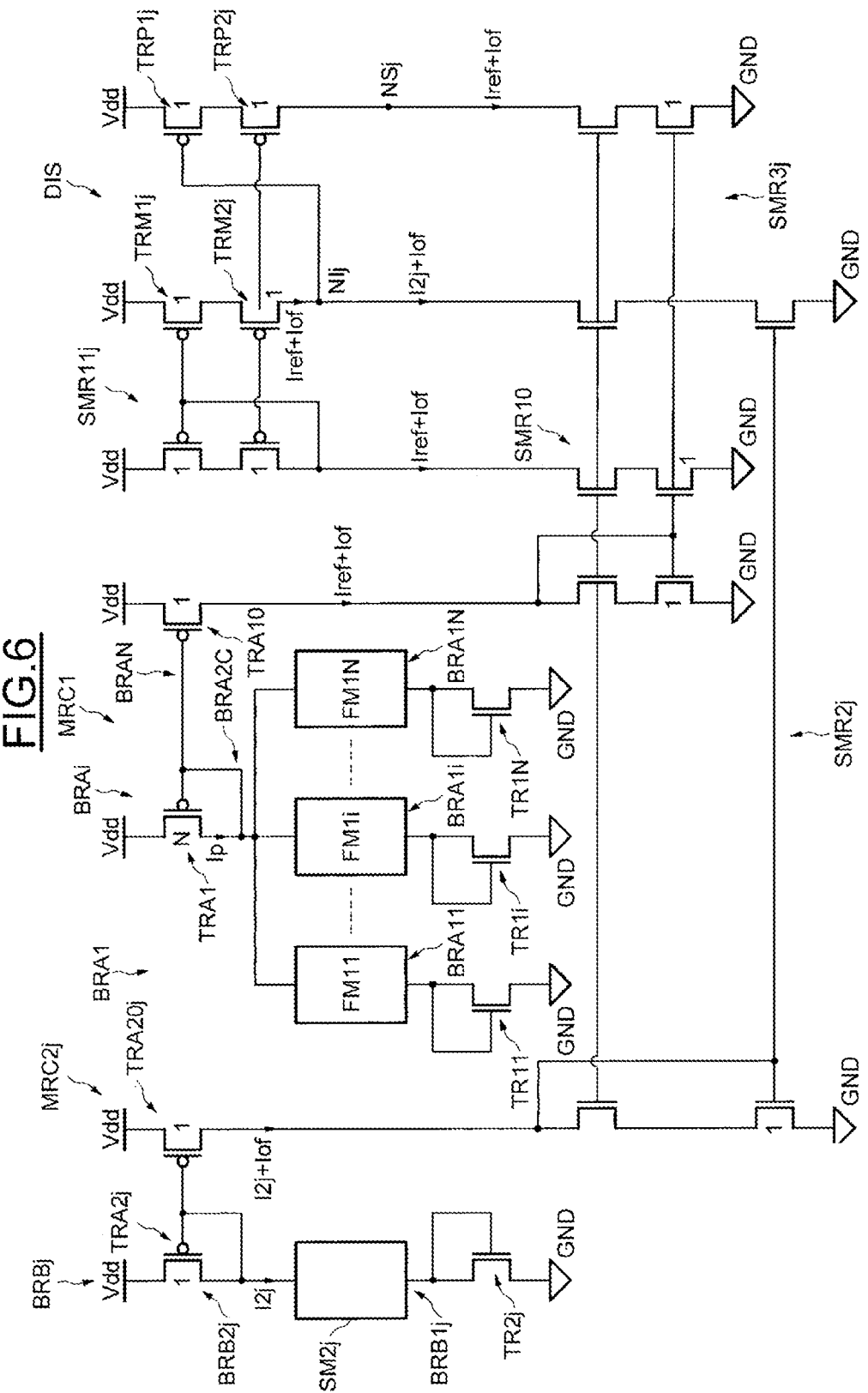
Figure 7:
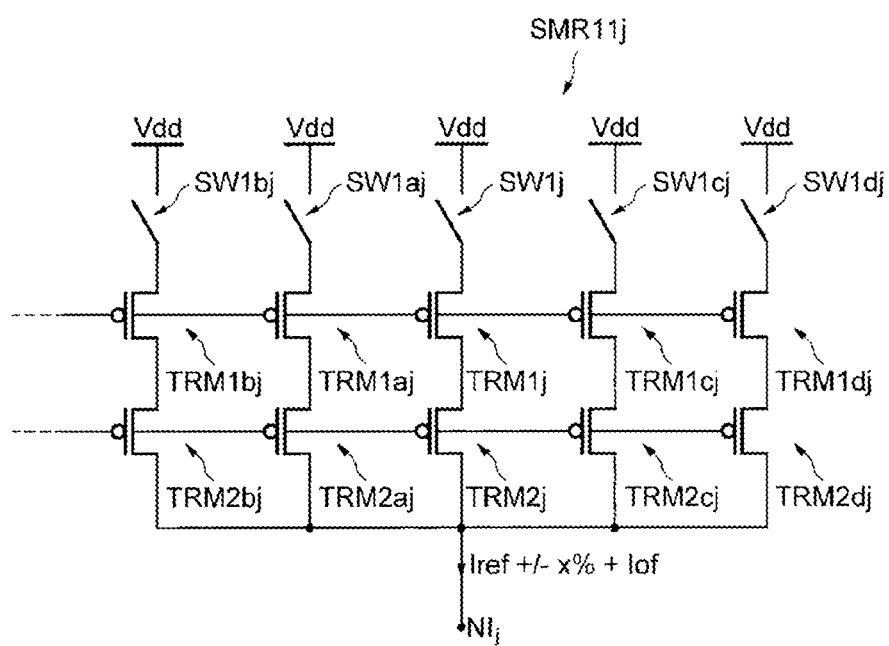

The variant illustrated in FIGS. 6 to 7 therefore aims to reduce these aging effects, or even to overcome them, so as to offer the provision of a perfectly repeatable digital code from one turn-on to another of the physically unclonable function device in a more reliable manner.

The embodiment illustrated in FIG. 6 contains the N diode-connected first transistors TR11-TR1N and the associated first circuit FM11-FM1N, as well as the second transistors, of which, for the sake of simplicity, only the jth one, referenced TR2j, is shown in this FIG. 6, with its associated second circuit SM2j and the other circuits or elements assigned the index j that are associated therewith and that will be described below.

Since the structures of the first transistors TR1i, of the one or more second transistors TR2j, and of their respective associated first circuit FM1i and second circuit SM2j are identical to those already described with reference to FIG. 2, these structures will not be described again.

As illustrated in FIG. 6, the physically unclonable function device DIS comprises, for each first transistor TR1i, a first branch BRA1i incorporating this first transistor TR1i and the corresponding first circuit FM1i.

The device DIS also comprises, for each second transistor TR2j, a second branch BRBj incorporating this second transistor and the corresponding second circuit SM2j.

And each first branch and each second branch are structurally identical, that is to say that they include structurally identical components or means, even though the size of some transistors may be different from a first branch to a second branch.

More precisely, each first branch BRAi includes a first part BRA1i incorporating the corresponding first transistor TR1i and the corresponding first circuit FM1i.

Each first branch also includes a second part BRA2C incorporating a diode-connected additional first transistor TRA1, this second part BRA2C being common to all of the first branches BRAi.

The first parts BRA1i of all of the first branches BRAi are connected to this common second part BRA2C.

Moreover, each second branch BRBj includes a first part BRB1j incorporating the corresponding second transistor TR2j and the corresponding second circuit SM2j and a second part BRB2j including a diode-connected additional second transistor TRA2j.

And the additional first transistor TRA1 and each additional second transistor TRA2j are configured so as to have one and the same gate-source voltage and one and the same drain-source voltage, even though they are not of the same size.

Specifically, the additional first transistor TRA1 has a width N times greater than the width of each additional second transistor TRA2j.

Moreover, the device DIS comprises an additional first current mirror MRC1 incorporating the additional first transistor TRA1 as well as another additional first transistor TRA10.

These two additional first transistors TRA1 and TRA10 have one and the same gate-source voltage but different respective drain-source voltages.

Moreover, the width of the additional first transistor TRA1 is N times greater than the width of the other additional first transistor TRA10.

Therefore, while the current flowing in the second part BRA2C common to all of the first branches BRAi is the current Ip equal to the sum of the currents flowing in the N first transistors TR1i, the first intermediate current delivered by the additional first current mirror MRC1 is the current Iref (equal to Ip/N) algebraically increased by the offset current Iof.

More precisely, this current Iref is equal to the average of the currents flowing in the N first transistors, while the offset current Iof results from the fact that the two additional first transistors TRA1 and TRA10 do not have the same drain-source voltage.

The device DIS also comprises, associated with each second branch BRBj, an additional second current mirror MRC2j incorporating the additional second transistor TRA2j as well as another additional second transistor TRA20j.

The two additional second transistors TRA2j and TRA20j have the same gate-source voltage but different respective drain-source voltages.

They also have one and the same width. This additional second current mirror MRC2j therefore delivers a current equal to the second current I2j algebraically increased by the offset current Iof.

In this case too, this offset current results from the fact that the two additional second transistors TRA2j and TRA20j do not have the same drain-source voltage.

Moreover, this other additional second transistor TRA20j and the other additional first transistor TRA10 have not only the same gate-source voltage but also the same drain-source voltage.

And, since the additional second transistor TRA2j and the additional first transistor TRA1 also have the same gate-source voltage and the same drain-source voltage, the offset current Iof delivered by each second current mirror MRC2j is equal to the offset current Iof delivered by the first current mirror MRC1.

Thus, as has just been seen, there is firstly a first current delivered by the additional first current mirror MRC1 and equal to the current Iref algebraically increased by the offset current Iof, and secondly a second current delivered by the additional second current mirror MRC2j and equal to the current I2j flowing in the second transistor TR2j, algebraically increased by the same offset current Iof.

And, as will now be seen, it is this first current and this second current that will be compared at the output node NSj so as to deliver a bit having a logic value depending on the comparison of these two currents.

The device DIS also includes a first cascode current mirror system coupled between the additional first current mirror MRC1, on the one hand, and each output node NIj or NSj, on the other hand.

This first cascode current mirror system includes, in this example, a first cascode mirror SMR10 having a division ratio of 1, coupled to the output of the additional first mirror MRC1, and a second cascode mirror SMR11j also having a division ratio of 1 and connected between the output of the first cascode mirror SMR10 and the node NIj.

The second cascode mirror SMR11j includes in particular two PMOS transistors, referenced TRM1j and TRM2j, connected in series between the supply terminal (delivering the supply voltage Vdd) and the node NIj.

The second cascode mirror SMR11j therefore delivers, to the node NIj, the first current Iref+Iof equal to the first intermediate current Iref+Iof delivered by the additional current mirror MRC1, since the division ratios of the cascode mirrors SMR10 and SMR11j are equal to 1.

The first cascode mirror system also includes a third cascode mirror SMR3j connected between the output of the first cascode mirror SMR10 and the output node NSj.

This third cascode mirror SMR3 also has a division ratio equal to 1, and therefore also delivers the first current equal to Iref+Iof.

The device DIS also includes a second cascode current mirror system SMR2j coupled between each additional second mirror MRC2j, on the one hand, and each output node NIj.

This second cascode mirror system SMR2j has a division ratio equal to 1 and is therefore configured so as to copy the second current I2j+Iof delivered by the additional second current mirror MRC2j.

Since the offset current Iof is identical on either side of the intermediate node NIj, it will be compensated for during the comparison performed at the node NIj.

Given the random distribution of the threshold voltages of all of the transistors TR1i, TR2j, the current I2j flowing through the second transistor TR2j may lie on one side or the other of the reference current Iref.

And, if the reference current Iref is higher than the current I2j, the voltage of the corresponding intermediate node NIj rises to Vdd.

If the reference current Iref is lower than the current I2j, the voltage of the corresponding intermediate node NIj drops to 0.

Although it would be possible to perform this comparison at the intermediate node NIj, this node then forming the output node, it is preferable to provide an output stage, advantageously with a high gain, between each intermediate node NIj and the corresponding output node NSj, in order to perform a current comparison at the output node NSj.

In this case too, the offset current Iof present on either side of the output node NSj is compensated for.

This output stage includes an additional first PMOS transistor TRP1j whose gate is connected to the intermediate node NIj and an additional second transistor TRP2j connected between the transistor TRP1j and the node NSj and whose gate is connected to the gate of the cascode transistor TRM2j of the cascode current mirror SMR11j.

The output stage also includes the two cascode transistors of the current mirror SMR3j connected in series to the output node NSj.

At this output node, if the reference current Iref is higher than the current I2j, the output signal has a first level corresponding to a first logic value for the corresponding bit, for example the value 0.

If the reference current Iref is lower than the current I2j, the output signal has a second level corresponding to a second logic value for the corresponding bit, for example the value 1.

In a manner analogous to the embodiment of FIG. 5, the embodiment of FIG. 7 makes it possible to detect bits of the digital code delivered by the device DIS whose values might not be stable and repeatable.

Specifically, when the device DIS of FIG. 6 is supplied with power, it may very well be the case that, for some second transistors TR2j, the currents flowing through them have levels close to the level of the reference current Iref.

In this case, the characteristics of the output stage may in particular lead to comparisons that give unstable or non-repeatable values from one turn-on to another.

In other words, the logic values of the bits associated with these second transistors may change from one turn-on to another, for example due to the comparison instability.

The embodiment of FIG. 7 makes it possible to detect these bits and to make a decision as to the management of their value.

This may advantageously be performed when the device DIS is first turned on.

As illustrated in FIG. 7, the cascode current mirror SMR11j has a division ratio that is able to be adjusted between a plurality of values including the value 1 and additional values situated either side of the value 1.

More precisely, what are shown are the two cascode transistors TRM1j and TRM2j connected to the intermediate node NIj and connected to the supply terminal intended to receive the supply voltage Vdd by a controllable switch SW1j.

The current mirror SMR11j also includes, in this example, four other cascode transistors TRM1aj, TRM1bj, TRM1cj, TRM1dj and TRM2aj, TRM2bj, TRM2cj and TRM2dj that are respectively connected to the supply terminal by four other controllable switches SW1aj, SW1bj, SW1cj and SW1dj.

The drains of these four other transistors TRM2aj, TRM2bj, TRM2cj and TRM2dj are also connected to the intermediate node NIj.

The ratio between the width of each other transistor and the width of the transistor TRM1j is equal to 1+/−x %.

For example, the ratio between the width of the transistor TRM1aj and the width of the transistor TRM1j is equal to 1+5%.

The ratio between the width of the transistor TRM1bj and the width of the transistor TRM1j is equal to 1+10%.

The ratio between the width of the transistor TRM1cj and the width of the transistor TRM1j is equal to 1−5%.

The ratio between the width of the transistor TRM1dj and the width of the transistor TRM1j is equal to 1−10%.

Thus, if one of these other transistors is activated, the current delivered to the intermediate node NIj will be offset by a few percent with respect to the current Iref delivered by the transistor TRM1j, that is to say with respect to the average of the sum of the currents flowing in the N first transistors TR1i.

In other words, the first current (Iref+Iof+/−x %) delivered to the node NIj will be offset by a few percent with respect to the first intermediate current (Iref+Iof) delivered by the additional first current mirror MRC1.

The structural modification of the mirror that has just been described is repeated for each intermediate node NIj, j varying from 1 to K.

At the first turn-on, one of the four switches SW1aj to SW1dj, for example the switch SW1bj, is selected for each intermediate node NIj.

Due to this offset in the reference current, the logic values of the unstable bits have the value for example 0.

The reference current is then offset in the other direction, by activating the switch symmetrical to the switch SW1bj, which is the switch SW1dj.

This therefore gives the previous bits the logic values 1.

Processing circuitry will then compare the digital code delivered to the output nodes NSj of the device DIS, bit by bit, so as to identify the bits whose logic values have changed between an offset to the right and an offset to the left of the reference current.

These bits are considered to be unstable.

These processing circuitry may include logic circuits.

The processing circuitry then make a decision as to the management of these unstable bits.

In this respect, three solutions are possible, for example.

A first solution involves not taking these unstable bits into consideration in the digital code delivered by the device DIS.

In this case, the digital code will not include these bits.

Another solution involves giving these unstable bits an arbitrary logic value.

It is also possible to choose an arbitrary combination of the three previous solutions as a solution.

And this decision will be stored in the device DIS.

At the end of this decision-making, the device DIS may then be put back in its first state corresponding to that illustrated in FIG. 6 (transistors TRM1j selected with a current ratio equal to 1), and the decision made as to the one or more unstable bits remains stored and applicable thereafter.

It will also be applicable in all subsequent turn-ons for which it will no longer be necessary to offset the current Iref.

A digital code that is perfectly repeatable from one turn-on to another is then achieved.

It should lastly be noted that, in this case too, the device DIS is produced using conventional CMOS production methods.

The invention claimed is:

1. An integrated circuit comprising an area that includes a physically unclonable function device, the device comprising:
    a set of diode-connected MOS transistors having a random distribution of respective threshold voltages, the set including N first transistors and at least one second transistor;
    a first circuit configured to impose, on each first transistor, a fixed respective gate voltage regardless of the value of a current flowing in this first transistor;
    a second circuit configured to impose, on each second transistor, a fixed respective gate voltage regardless of the value of a current flowing in this second transistor; and a comparator configured to deliver a signal whose level depends on a comparison between a first current obtained from a reference current substantially equal to an average of the currents flowing in the N first transistors, and a second current obtained from a current flowing in the at least one second transistor.

2. The integrated circuit as claimed in claim 1, wherein the first circuit comprises, for each first transistor, a first negative-gain amplifier and an associated first bias transistor;
wherein an output of each first negative-gain amplifier is coupled to an input of that first negative gain amplifier via the associated first bias transistor;
wherein the first negative-gain amplifier is coupled to a gate of the first transistor;
wherein the first bias transistor has a first conductive electrode coupled to the input of the first negative-gain amplifier and a second conductive electrode; and
wherein the second conductive electrodes of the first bias transistors associated with the N first transistors are connected to one another.

3. The integrated circuit as claimed in claim 2, wherein the first amplifier comprises a first input transistor in a common source configuration, the first input transistor including a gate of coupled to the input of the first amplifier, a first conductive electrode coupled to a reference supply terminal, and a second conductive electrode coupled to the output of the first amplifier, the output of the first amplifier being coupled to a first bias stage and to the gate of the first bias transistor.

4. The integrated circuit as claimed in claim 3, wherein the first amplifier further comprises a cascode transistor coupled between the second conductive electrode of the first input transistor and the output of the first amplifier.

5. The integrated circuit as claimed in claim 2, wherein the N first transistors, the first amplifier and the first bias transistor are of the same conductivity type.

6. The integrated circuit as claimed in claim 1, wherein the second circuit comprises, for each second transistor, a second negative-gain amplifier and a second bias transistor;
wherein an output of the second negative-gain amplifier is fed back, by way of a second bias transistor, to an input of the second negative-gain amplifier;
wherein the input of the second negative-gain amplifier is coupled to a gate of the second transistor; and
wherein the second bias transistor has a first conductive electrode coupled to the input and a second conductive electrode coupled to a corresponding output node.

7. The integrated circuit as claimed in claim 6, wherein the second amplifier comprises a second input transistor in a common source configuration, the second input transistor having a gate coupled to the input of the second amplifier, a first conductive electrode coupled to a reference supply terminal, and a second conductive electrode coupled to the output of the second amplifier, wherein the output of the second amplifier is coupled to a second bias stage and to the gate of the second bias transistor.

8. The integrated circuit as claimed in claim 7, wherein the second amplifier further comprises a cascode transistor coupled between the second conductive electrode of the second input transistor and the output of the second amplifier.

9. The integrated circuit as claimed in claim 6, wherein each second transistor, the second amplifier and the second bias transistor are of the same conductivity type.

10. The integrated circuit as claimed in claim 1, wherein the first circuit comprises, for each first transistor, a first negative-gain amplifier and an associated first bias transistor;
wherein an output of each first negative-gain amplifier is coupled to an input of that first negative gain amplifier via the associated first bias transistor;
wherein the first negative-gain amplifier is coupled to a gate of the first transistor;
wherein the first bias transistor has a first conductive electrode coupled to the input of the first negative-gain amplifier and a second conductive electrode;
wherein the second conductive electrodes of the first bias transistors associated with the N first transistors are connected to one another;
wherein the second circuit comprises, for each second transistor, a second negative-gain amplifier and a second bias transistor;
wherein an output of the second negative-gain amplifier is fed back, by way of a second bias transistor, to an input of the second negative-gain amplifier;
wherein the input of the second negative-gain amplifier is coupled to a gate of the second transistor;
wherein the second bias transistor has a first conductive electrode coupled to the input and a second conductive electrode coupled to a corresponding output node; and
wherein the first circuit and the second circuit are structurally identical and the transistors of the first circuit and the transistors of the second circuit are matched transistors.

11. The integrated circuit as claimed in claim 1, wherein the first current is the reference current and the second current is the current flowing in the at least one second transistor.

12. The integrated circuit as claimed in claim 11, comprising a current mirror stage coupled between the first circuit and the second circuit, the current mirror stage configured to deliver the reference current from a sum of the currents flowing in the first transistors.

13. The integrated circuit as claimed in claim 12, wherein the current mirror has a division ratio equal to 1/N.

14. The integrated circuit as claimed in claim 12, wherein the current mirror has a division ratio that adjustable between a plurality of values including 1/N, a value greater than 1/N and a value less than 1/N.

15. The integrated circuit as claimed in claim 1, wherein the first current is the reference current algebraically increased by an offset current and the second current is the current flowing in the at least one second transistor algebraically increased by the offset current.

16. The integrated circuit as claimed in claim 15, wherein the device further comprises, for each first transistor, a first branch incorporating the first transistor and the corresponding first circuit and, for each second transistor, a second branch incorporating the second transistor and the corresponding second circuit, each first branch and each second branch being structurally identical.

17. The integrated circuit as claimed in claim 16, wherein each first branch includes a first part incorporating the corresponding first transistor and the corresponding first circuit and a second part incorporating a diode-connected additional first transistor;
wherein the second part is common to all of the first branches;
wherein the first parts of all of the first branches are connected to the common second part;

wherein each second branch incorporates the corresponding second transistor, the corresponding second circuit and a diode-connected additional second transistor; and wherein the additional first transistor and each additional second transistor are configured so as to have one and the same gate-source voltage and one and the same drain-source voltage.

18. The integrated circuit as claimed in claim 17, wherein the device further comprises:
an additional first current mirror incorporating the additional first transistor and configured to deliver, from the current flowing in the common second part, a first intermediate current equal to the average of the currents flowing in the N first transistors algebraically increased by the offset current; and
associated with each second branch, an additional second current mirror incorporating the corresponding additional second transistor and configured to deliver the corresponding second current.

19. The integrated circuit as claimed in claim 18, wherein the additional first mirror has a division ratio equal to 1/N and incorporates another additional first transistor, the two additional first transistors being configured so as to have one and the same gate-source voltage but different respective drain-source voltages.

20. The integrated circuit as claimed in claim 19, wherein the additional first mirror has a division ratio equal to 1/N and incorporates another additional first transistor, the two additional first transistors being configured so as to have one and the same gate-source voltage but different respective drain-source voltages and wherein the other additional first transistor and each other transistor additional second transistor have the same gate-source voltage and the same drain-source voltage.

21. The integrated circuit as claimed in claim 18, wherein each additional second current mirror has a division ratio equal to one and incorporates another additional second transistor, the two additional second transistors being configured so as to have one and the same gate-source voltage but different respective drain-source voltages.

22. The integrated circuit as claimed in claim 18, wherein the device further comprises:
a first cascode current mirror system coupled between the additional first current mirror and each output node and configured so as to deliver the first current from the first intermediate current; and
a second cascode current mirror system coupled between each additional second mirror and each output node and configured so as to copy the second current.

23. The integrated circuit as claimed in claim 22, wherein the first cascode current mirror system has a division ratio equal to one.

24. The integrated circuit as claimed in claim 22, wherein the first cascode current mirror system has a division ratio that is adjustable between a plurality of values including the value one, a value less than one and a value greater than one.

25. A method for automatically generating an unpredictable unique code at each output node of a physically unclonable function device that includes a set of diode-connected MOS transistors having a random distribution of respective threshold voltages, the set including N first transistors and at least one second transistor, the method comprising
imposing, on each first transistor, a fixed respective gate voltage regardless of the value of a current flowing in this first transistor;
imposing, on each second transistor, a fixed respective gate voltage regardless of the value of a current flowing in this second transistor; and
delivering a signal with a level that depends on a comparison between a first current obtained from a reference current substantially equal to the average of the currents flowing in the N first transistors and a second current obtained from a current flowing in the at least one second transistor.

26. A physically unclonable function device comprising:
a set of diode-connected MOS transistors having a random distribution of respective threshold voltages, the set including N first transistors and at least one second transistor;
means for imposing, on each first transistor, a fixed respective gate voltage regardless of the value of a current flowing in this first transistor;
means for imposing, on each second transistor, a fixed respective gate voltage regardless of the value of a current flowing in this second transistor; and
an output node of the function capable of delivering a signal whose level depends on a comparison between a first current obtained from a reference current equal or substantially equal to the average of the currents flowing in the N first transistors and a second current obtained from a current flowing in the at least one second transistor.

* * * * *